UNITED STATES PATENT OFFICE.

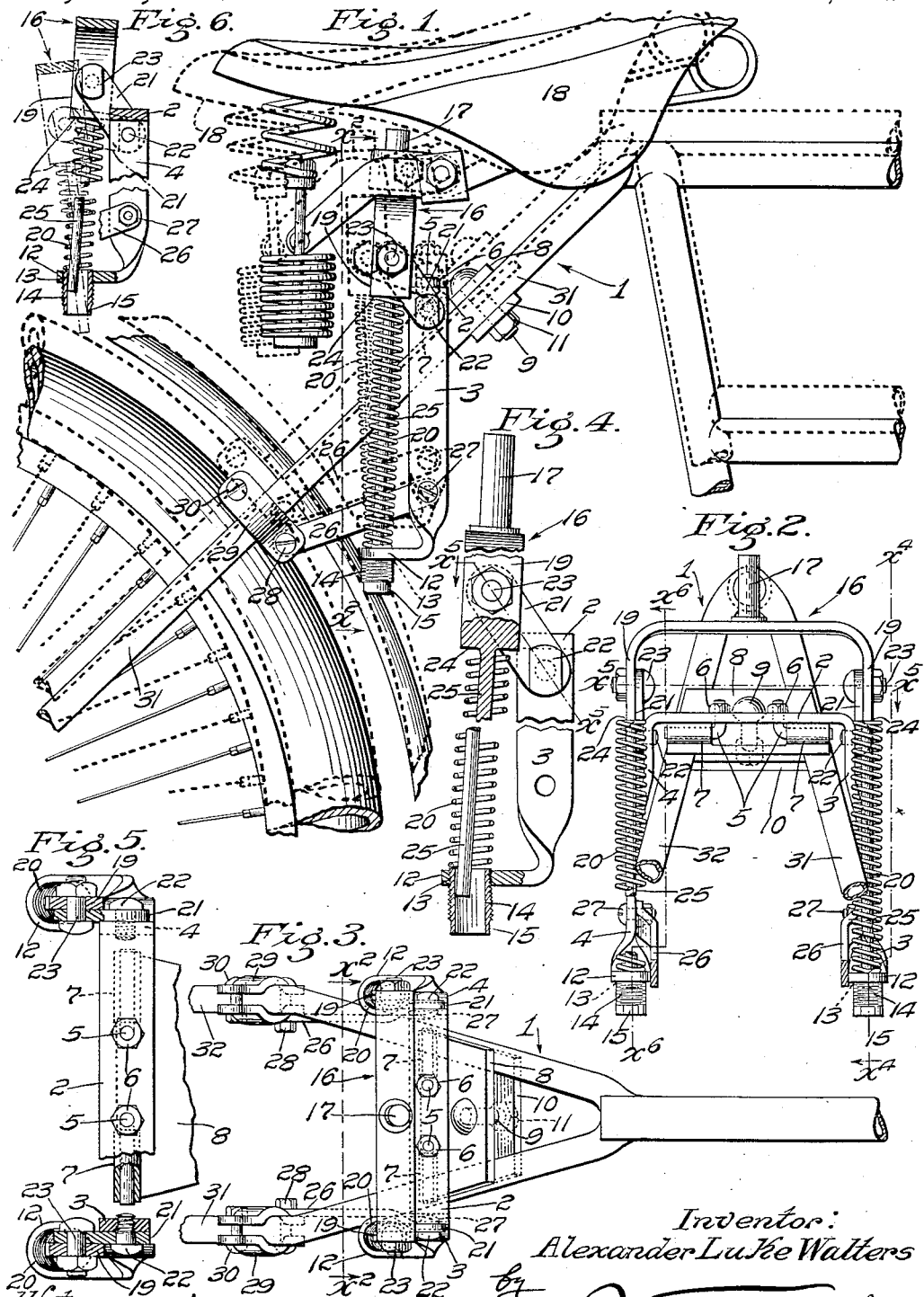
A. L. WALTERS.
SHOCK ABSORBER FOR MOTOR CYCLES AND THE LIKE.
APPLICATION FILED JAN. 6, 1911.
1,042,060.  Patented Oct. 22, 1912.
Inventor:
Alexander Luke Walters
by James R. Townsend
his atty.

ALEXANDER LUKE WALTERS, OF LOS ANGELES, CALIFORNIA, ASSIGNOR OF ONE-HALF TO FRANK B. GRIMSHAW, OF LOS ANGELES, CALIFORNIA.

SHOCK-ABSORBER FOR MOTOR-CYCLES AND THE LIKE.

1,042,060.	Specification of Letters Patent.	Patented Oct. 22, 1912.

Application filed January 6, 1911. Serial No. 601,172.

*To all whom it may concern:*

Be it known that I, ALEXANDER LUKE WALTERS, a citizen of the United States, residing at Los Angeles, in the county of Los Angeles and State of California, have invented a new and useful Shock-Absorber for Motor-Cycles and the Like, of which the following is a specification.

An object of this invention is to provide a simple, compact shock absorber that will afford maximum ease to the rider and improved security against shocks from starting and stopping and from going over irregularities of the road surface; and that is of superior lightness, strength, longevity and freedom from getting out of order.

Another object is to produce a device of this class which can be very easily mounted upon any motor cycle in use and adjusted to maintain the saddle at a low position on the cycle frame.

The accompanying drawings illustrate the invention.

Figure 1 is a fragmental elevation of a shock absorber embodying this invention and mounted upon a motor-cycle, a fragment of the rear portion of which is shown. Solid lines represent the normal position, and dotted lines show a position the absorber assumes when in action as the rear wheel goes over a bump. Fig. 2 is a broken fragmental rear elevation viewed from line $x^2$, Figs. 1 and 3, omitting the saddle. Fig. 3 is a plan looking down on Fig. 2. Fig. 4 is an enlarged fragmental detail partly in section along the axis of the near guide and the adjusting nut seen in Fig. 1. This view illustrates the means of adjusting the spring tension. Line $x^4$—$x^4$, Fig. 2, partially indicates the line from which the view is taken. Fig. 5 is an enlarged fragmental plan, the near side being in section on line $x^5$ in Fig. 4, and the farther side in section on line $x^5$, in Fig. 2. Fig. 6 is a sectional elevation on irregular line $x^6$—$x^6$, Fig. 2. Solid lines show the saddle support at its uppermost position. Dotted lines indicate a depressed position of the saddle support.

On the rear fork 1 of the motorcycle frame an adjustable inverted U-shaped hanger comprising a top cross bar 2 and two depending arms 3, 4, is adjustably hinged by means of bent studs 5 fastened to the cross bar by nuts 6 and extending in alinement with each other through knuckles 7 on the upper side of the upper clamp plate 8 which is adjustably fastened on top of the rear forks by a bolt 9 extending through the lower clamp plate 10 and fastened by a nut 11.

The arms 3, 4, of the adjustable hanger may be twisted and bent at their tips to form spring supports 12 provided with threaded holes 13 into which are screwed hollow spring supporting and adjusting nuts 14 to screw into the supports 12 and having seats 15 for a wrench, not shown, by which they may be screwed up and down.

A seat support 16 having a post 17 for a saddle 18 and having legs 19 supported by coil springs 20 carried by said supports through the medium of the hollow adjusting nuts 14 on which the springs directly rest, is pivotally connected to the hanger by means of rigid links 21 which are pivoted to the arms 3, 4, by studs 22 and to the legs 19 by bolts 23. The legs 19 are flat at the top and are reduced below their tops to form shoulders 24 and guide-rods 25, the shoulders 24 resting on the springs 20, and the guide rods 25 being arranged to move up and down within the springs and the hollow nuts when the absorber is in action to resist and absorb the shock. The hollow nuts serve as ways to guide and retain the lower ends of the guide rods. The links 21 extend upward rearwardly aslant from the brackets toward the seat support and its post, so that upward movement of the hanger arms 12 toward the seat or downward movement of the seat toward the hanger arms can only be effected by swinging the links through an arc between vertical and horizontal planes that intersect at the axis of the pivots between the links and hangers.

The arms 3 and 4 of the hanger may be held in true position by stays 26 which extend rearwardly from the arms, and are inbent to clear the springs 20, and are fixed by bolts 27 to the bottom portions of the arms 3 and 4 and by clamp bolts 28 to clamps 29 which are adjustably clamped by the bolts 28 and 30 to the parallel limbs 31 and 32 of the rear fork.

The guide rods 25 are of less diameter than the way therefor inside the spiral spring and the adjusting nut; and when the seat support is depressed, the rods play up and down and swing forward and back inside the springs and the nuts; the lower ends of the guide rods contacting with the front side of the nut when the saddle is depressed and with the rear side of the nut when the saddle is released. The links 21 are arranged above the tops of the springs and slant forward downwardly from the seat support to the hanger; and when the seat support rises, the tops of the springs contact with the under edges of the links, and each link acts as a stop to prevent undue recoil of its spring and to hold the spring on its seat and the lower end of the guide rod in the nut, as shown in Fig. 6.

The seat support and hanger are guided in their relative travel by the combined action of the guide rods, the hollow nuts and the links 21. Said links oscillate on the studs 22 and bolts 23 so that when the motor rises in passing over an obstruction, and the weight of the rider holds the saddle from correspondingly rising, the springs 20 allow the hanger to rise relative to the seat support, and the oscillation of the links tend to depress the seat support and the saddle and to move the same backward and the saddle downward as indicated by the dotted lines in Fig. 1, at the same time that the hanger rises; and when the hanger descends the action of the links under the force of the springs returns the saddle forward and upward to normal position. By thus providing means for lowering the saddle as the forks rise and raising the saddle as the forks are lowered, the shock is minimized and the body of the rider is allowed to maintain a practically level course.

By loosening the clamps 29 and sliding the same up and down the slanting fork 31, the arms of the hanger may be adjusted to the desired angle with the forks; said hanger for this purpose swinging freely on the hinge formed by the studs and knuckles 5 and 7 while the clamps are loosened for the purpose of adjusting the shock absorber to the wheel forks, but being fixed at all times when the shock absorber is installed for use.

The springs 20 respond readily to absorb any vibration, cushion easily and greatly promote the comfort of the rider. The tension of said springs may be readily increased or decreased so as to give a stiffer or easier cushioning effect by adjusting the nuts 14 while the guide rods 25 prevent the springs from buckling. The saddle support and hanger are relatively guided by the links 21 which oscillate on the studs 22, 23; thereby carrying the rider slightly backward and downward when the machine and saddle respond to vertical impulses. The link 21 on either side is directly above the top of the coil spring on that side; and the spring is longer than the space between the link and the spring support, and is compressed between the spring support and the link in the operation of assembling the shock absorber, so that the link forms a stop for and resting on the spring to prevent the spring from withdrawing the guide rod 25 from the hollow spring seat formed by the adjusting nut 14.

I claim:—

1. A shock absorber comprising a hanger provided at the lower end with a spring support, a spring carried by the spring support, a seat support resting on the spring and provided with a guide rod that extends into the spring support, and a link connecting between the hanger and the seat support, above the spring support.

2. A shock absorber comprising a hanger provided at the lower end with a spring support, a spring carried by the spring support, a seat support resting on the spring and provided with a guide rod that extends into the spring support, a link connecting between the hanger and the seat support, above the spring support, and means adjustable relative to the hanger to adjust the tension of the spring.

3. A shock absorber comprising an inverted U-shaped hanger provided at the lower end with spring supports; coil springs carried by the spring supports; a seat support having legs resting on the springs and terminating in guide rods that extend inside the springs and spring support, and links pivoted to the seat support and to the hanger.

4. A shock absorber comprising an inverted U-shaped hanger provided at the lower end with spring supports; coil springs carried by the spring support; a seat support having legs resting on the springs and terminating in guide rods that extend inside the springs and spring support, and links pivoted to the seat support and to the hanger; said links being above the springs and engaging the same to prevent the guide rods from being withdrawn from the spring supports.

5. In a shock absorber a seat support, spring means to support the seat support, and means to move the seat support backward as the spring means are contracted.

6. In a shock absorber, a support, a hollow nut screwed into the support, a spring on the hollow nut, a link pivotally connected with the support, a seat support pivotally connected with the link and provided with a shoulder for the spring and also with a guide rod extending into the hollow nut.

7. The combination with the sloping rear fork of a motor-cycle frame, of a clamp plate adjustably fastened to the fork and provided with a knuckle, a hanger comprising a top cross bar and two depending arms, bent studs extending through the cross bar and extending in alinement with each other through the knuckles, nuts on the studs to hold them in the cross bar, stays pivoted to the arms, clamps pivoted to the stays and adapted to clamp the forks, springs carried by the hanger, a seat support on the springs and provided with guide rods, means to guide the rods at their lower ends and links pivotally connecting the hanger and the seat support.

8. The combination with the slanting forks of a motor-cycle frame, of a plate adjustably fastened to the forks and provided with a knuckle, a hanger, a seat support, springs carried by the hanger and arranged to carry the seat support, said hanger being provided with a cross bar and depending arms, bent studs extending in the knuckles in alinement with each other and through the cross bar and fastened by nuts, stays pivoted to the arms, and clamps pivoted to the stays and clamped to the forks.

9. A shock absorber comprising a hanger having two legs bent at the ends to form spring supports, coil springs on said supports, a seat support on the springs, links between the seat support and hanger; said seat support being provided with guide rods, and means to guide the rods.

10. A shock absorber comprising a hanger provided with two legs bent at the lower ends thereof to form spring supports, springs on said supports; said supports being provided with hollow nuts to adjust the springs, a seat support provided with legs resting on said springs and having guide rods extending through the springs and into the nuts, and links pivotally connecting the seat support with the hanger.

11. In a shock absorber, a hanger, a spiral spring supported at its lower end by the hanger, a seat support having a guide rod extending loosely down through the spring and the hanger; a link pivoted to the hanger and to the seat support and contacting with the spring and thereby normally held aslant and at the same time restraining the spring and thereby preventing the guide-rod from being retracted from the hanger.

In testimony whereof, I have hereunto set my hand at Los Angeles, California, this 22d day of December, 1910.

ALEXANDER LUKE WALTERS.

In presence of—
JAMES R. TOWNSEND,
L. BELLE RICE.

---

Copies of this patent may be obtained for five cents each, by addressing the "Commissioner of Patents, Washington, D. C."